United States Statutory Invention Registration [19]

[11] Reg. Number: H800

Beahm et al. [43] Published: Jul. 3, 1990

[54] METHOD FOR GETTERING ORGANIC, INORGANIC AND ELEMENTAL IODINE IN AQUEOUS SOLUTIONS

[75] Inventors: Edward C. Beahm; William E. Shockley, both of Oak Ridge, Tenn.

[73] Assignee: The United States of America as represented by the United States Department of Energy, Washington, D.C.

[21] Appl. No.: 341,005

[22] Filed: Apr. 20, 1989

[51] Int. Cl.[5] ..... G21F 9/08; G21F 9/02; G21F 9/04

[52] U.S. Cl. ..... 252/631; 252/630; 376/306; 376/305; 376/310; 376/418; 210/682

[58] Field of Search ..... 252/631, 635, 630, 181.1, 252/181.6, 182.1, 182.32, 182.33; 376/261, 272, 306, 305, 310, 418; 210/682

[56] References Cited

U.S. PATENT DOCUMENTS

| | | | |
|---|---|---|---|
| 3,865,688 | 2/1975 | Kleimola | 376/418 |
| 3,896,042 | 7/1975 | Anderson et al. | 252/181.6 |
| 3,898,125 | 8/1975 | Grossman et al. | 252/181.2 |
| 3,899,392 | 8/1975 | Grossman et al. | 252/181.6 |
| 3,969,185 | 7/1976 | Ross et al. | 376/418 |

*Primary Examiner*—Howard J. Locker
*Assistant Examiner*—John M. Covert
*Attorney, Agent, or Firm*—Katherine P. Lovingood; Stephen D. Hamel; William R. Moser

[57] ABSTRACT

A process for the removal of iodine from aqueous solutions, particularly the trapping of radioactive iodine to mitigate damage resulting from accidents or spills associated with nuclear reactors, by exposing the solution to well dispersed silver carbonate which reacts with the iodine and iodides, thereby gettering iodine and iodine compounds from solution. The iodine is not only removed from solution but also from the contiguous vapor.

1 Claim, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR GETTERING ORGANIC, INORGANIC AND ELEMENTAL IODINE IN AQUEOUS SOLUTIONS

The invention was developed pursuant to a contract with the United States Department of Energy. This invention relates to the removal of iodine from aqueous solutions, particularly the trapping of radioactive iodine to mitigate damage resulting from accidents or spills associated with nuclear reactors.

BACKGROUND OF THE INVENTION

The subject invention relates to methods for removing iodine, particularly molecular $I_2$ and organic iodide compounds, from water pools. A principal area of need for this technology is the nuclear reactor industry where it is important to restrict release of radioactive iodine which can occur in accident situations or from mishandling during normal operations. In severe nuclear reactor accidents, iodine-containing water pools will be present in the containment structure. Controlling the release of the iodine from the water pools will be a significant factor in the mitigation of damage. The most troublesome of this class of compounds are the organic iodides for which no easy method of removal is presently available.

A wide range of chemicals has been studied at Oak Ridge National Laboratory for effective removal of organic iodides from aqueous solution. One of the best reagents for this purpose is sodium thiosulfate which reacts with organic iodides as well as $I_2$ and $I^-$. Unfortunately sodium thiosulfate is not stable in radioactive environments. Therefore, there is a need for a reagent that can remove the radioactive species of organic iodides as well as $I_2$ and $I^-$ from aqueous solution.

SUMMARY OF THE INVENTION

In view of the above needs, it is an object of this invention to provide a process for removing iodine from aqueous streams.

It is another object of this invention to provide a process for removing organic and inorganic iodides from radioactive aqueous streams.

An additional object of this invention is to provide a process for cleaning spills in the event of a nuclear reactor accident.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities an combinations particularly pointed out in the appended claims.

To achieve the foregoing and other objects and in accordance with the purpose of the present invention, as embodied and broadly described herein, the process of this invention may comprise removing iodine and iodide compounds from aqueous solution by exposing the solution to well dispersed silver carbonate which reacts with the iodine and iodides, thereby gettering iodine and iodine compounds from solution. This is an improvement over prior methods that were inappropriate for use in radiation environments.

DETAILED DESCRIPTION OF THE PREFERRED EMBODIMENT

The invention is based on the discovery that silver carbonate well dispersed in water converts virtually all iodine including elemental iodine, inorganic iodides and organic iodides into a nonvolatile form. Elemental iodine and organic iodides are chemical forms of iodine that can volatilize from water pools. In severe nuclear reactor accidents, water pools would contain boric acid and would be irradiated from fission products and fuel debris. This invention has been shown to be effective in both irradiated and unirradiated water pools and also in water pools with or without boric acid.

In order to practice the invention, it is only necessary to introduce well dispersed silver carbonate into the iodine containing water so that the overall amount, both dissolved and undissolved, is $1\times10^{-3}$ mol/L. $I_2$ may be treated ar a lower concentration of $1\times10^{-4}$ mol/L, but conversion of organic iodide is increased when a concentration of $1\times10^{-3}$ mol/L is used.

Dispersal of silver carbonate can be accomplished by placing the material in water in an ultrasonic system and then adding the resulting slurry into the water pool. This not only getters dissolved iodine and iodides by compound formation and precipitation, it also getters volatile iodine and iodides as well.

Example

The effectiveness of this iodine retaining process has been demonstrated in tests in an open system of aqueous solution and air where air was removed and stripped of iodine at a rate that resulted in replacement of the air volume in one hour. Results of these tests are given in the Table.

| OPEN SYSTEM TESTS | | | |
|---|---|---|---|
| Room temperature | | $Ag_2CO_3$:1 $\times 10^{-3}$ | |
| $I_2$ control (initially $5\times10^{-5}$ mol/L $I_2$) | | | |
| Without treatment | None | 27 | 138 |
| | None | 32 | 309 |
| With $Ag_2CO_3$ treatment | 98 | None detected <0.002 | 72 |
| 0.05 M o-boric acid with $Ag_2CO_3$ treatment | >99 | 0.002 | 72 |
| $\gamma$ irradiated (0.45 Mrad/h) with $Ag_2CO_3$ treatment | 95 | 2 | 29 |
| Organic iodide control (initially $1\times10^{-4}$ mol/L $CH_3I$) | | | |
| Without treatment | None | 56 | 66 |
| | None | 58 | 186 |
| With $Ag_2CO_3$ treatment | 95 | 5 | 141 |
| $\gamma$ irradiated (0.45 Mrad/h) with $Ag_2CO_3$ treatment | 93 | 7 | 29 |

In all the tests that employed $Ag_2CO_3$, more than 90% of the initial iodine was associated with dispersed or settled solids. These solids can easily be removed by filtration. Also, there was a large reduction in the percentage of the initial iodine that volatilized. Thus, this invention provides for both control of volatility and for removal of iodine from water pools.

The present invention provides the buffer for pH control, the ability to remove both $I_2$ and organic iodide, effectiveness under irradiation, and removal of iodine with a solid that is unmatched by alternative methods. The next best technique known to the applicants is a combination of a reducing agent such as thiosulfate or hydrazine with a pH buffer such as a borate. However, this would not be stable under irradiation, and the reducing agents are subject to depletion by atmospheric oxidation. In addition, such a technique would not permit removal with solids.

Since the process is one for removing iodine form solution, it could be used as a method of separating fission products in a waste stream while maintaining low volatility. For example, the invention could be used to remove iodine leaving cesium ions which could then be treated by cation exchange. Because of the very low solubility product of silver iodide, this invention also is very effective at removing inorganic iodides from solution.

We claim:

1. A process for removing iodine, from aqueous solution and from vapor contiguous thereto comprising exposing an iodine-containing solution to well dispersed silver carbonate which reacts with said iodine, thereby gettering said iodine from solutio and contiguous vapor.

* * * * *